United States Patent
Olesen (10) Patent No.: US 9,776,896 B2
(45) Date of Patent: Oct. 3, 2017

(54) CONTAINER, SERIES OF CONTAINERS AND METHOD FOR TREATING LIQUIDS

(71) Applicant: IAA IP ApS, Egå (DK)

(72) Inventor: Jens Ole Olesen, Ebeltoft (DK)

(73) Assignee: IAA IP ApS, Egä (DK)

( * ) Notice: Subject to any disclaimer, the term of this patent is extended or adjusted under 35 U.S.C. 154(b) by 0 days.

(21) Appl. No.: 14/895,760

(22) PCT Filed: Jun. 4, 2014

(86) PCT No.: PCT/DK2014/050162
§ 371 (c)(1),
(2) Date: Dec. 3, 2015

(87) PCT Pub. No.: WO2014/194919
PCT Pub. Date: Dec. 11, 2014

(65) Prior Publication Data
US 2016/0115056 A1    Apr. 28, 2016

(30) Foreign Application Priority Data

Jun. 4, 2013 (EP) .................................... 13170459

(51) Int. Cl.
*C02F 3/08* (2006.01)
*C02F 3/20* (2006.01)
(Continued)

(52) U.S. Cl.
CPC .............. *C02F 3/085* (2013.01); *C02F 3/006* (2013.01); *C02F 3/201* (2013.01); *C02F 3/22* (2013.01);
(Continued)

(58) Field of Classification Search
CPC .......... C02F 3/085; C02F 3/006; C02F 3/201; C02F 3/22; C02F 3/001; C02F 2301/02; C02F 2303/26; Y02W 10/15
(Continued)

(56) References Cited

U.S. PATENT DOCUMENTS

2002/0185418 A1    12/2002  Haridas et al.
2007/0264704 A1*   11/2007  Van Toever ........ B01F 3/04773
                                                           435/262
(Continued)

FOREIGN PATENT DOCUMENTS

EP    2394966    12/2011
GB    2315264    1/1998
(Continued)

*Primary Examiner* — Fred Prince
(74) *Attorney, Agent, or Firm* — Dykema Gossett PLLC (57) ABSTRACT

The present invention relates preferably to ways of biologically treating liquids, and devices applicable in this respect. Processes and devices according to the present invention preferably relates to a system for biological treatment of liquid such as water, the system typically comprising a container having first and second gas supplies for creating a first and second circulating flow of liquid and bio-film carriers and preferably also for aerating the liquid. Preferred embodiments of a container according to the invention comprises an outflow channel extending along, and preferably throughout, a perimeter of an upper part of the container, the flow channel having a fluid penetrable wall section facing inwardly so that fluid may flow from the interior of the container, through the fluid penetrable wall section and into the outflow channel, and an outlet for leading fluid out from the outflow channel.

32 Claims, 7 Drawing Sheets

(51) Int. Cl.
*C02F 3/22* (2006.01)
*C02F 3/00* (2006.01)

(52) U.S. Cl.
CPC .... *C02F 2003/001* (2013.01); *C02F 2301/02* (2013.01); *C02F 2303/26* (2013.01); *Y02W 10/15* (2015.05)

(58) Field of Classification Search
USPC ....... 210/603, 605, 615, 616, 617, 630, 150, 210/151, 604
See application file for complete search history.

(56) References Cited

U.S. PATENT DOCUMENTS

| | | |
|---|---|---|
| 2009/0130742 A1 | 5/2009 | Frisch et al. |
| 2012/0152831 A1 | 6/2012 | Blum |
| 2013/0001161 A1* | 1/2013 | Boner ...................... C02F 3/04 210/615 |

FOREIGN PATENT DOCUMENTS

| | | |
|---|---|---|
| WO | 9201637 | 2/1992 |
| WO | 9603351 | 2/1996 |
| WO | 02092519 | 11/2002 |
| WO | 2007058557 | 5/2007 |

\* cited by examiner

CONTAINER, SERIES OF CONTAINERS AND METHOD FOR TREATING LIQUIDS

The present invention relates preferably to ways of biologically treating liquids, and devices applicable in this respect and methods. Processes and devices according to the present invention preferably relates to a container or container system for biological treatment of liquid such as water, the container or container system typically comprising a container having first and second gas supplies for creating a first and second circulating flow of liquids and bio-film carriers and preferably also for aerating the liquid. Preferred embodiments of a container according to the invention comprises an outflow channel extending along, and preferably throughout, a perimeter of an upper part of the container, the flow channel having a fluid penetrable wall section facing inwardly so that fluids may flow from the interior of the container, through the fluid penetrable wall section and into the outflow channel, and an outlet for leading fluids out from the outflow channel.

FIELD OF THE INVENTION

The present invention relates preferably to ways of biologically treating liquids, and devices applicable in this respect. Processes and devices according to the present invention preferably relates to a system for biological treatment of liquid such as water, the system comprising a container having first and second aearation means for creating a first and second circulating flow of liquids and bio-film carriers. Preferred embodiments of a container according to the invention comprises an outflow channel extending along, and preferably throughout, a perimeter of an upper part of the container, the flow channel having a fluid penetrable wall section facing inwardly so that fluids may flow from the interior of the container, through the fluid penetrable wall section and into the outflow channel, and an outlet for leading fluids out from the outflow channel.

BACKGROUND OF THE INVENTION

Today, increasing demands for processing liquids are present. The processing often involves biological treatment of liquids such as wastewater, semiliquid manure etc. Various attempts have been made to optimise processes for biological treatment of liquids e.g. as presented in WO 9603351.

US 2002/0185418 A1 discloses s biological reactor process for continuous purification of wastewater by converting its constituents to a solid form that can be easily separated using retainable biological catalysts and a novel reactor. The reactor comprising a reaction vessel and at least one draft tube open at both ends and mounted on a bottom of the vessel. Inside the vessel, a circulatory flow is established as well as a bed of bio carriers. However, the exposure of wastewater to the bio carriers are found limited due to the formation of a bed, and it is found that a zone is created inside the reactor where no or limited flow occurs.

WO 2007/058557 discloses an apparatus for high rate anaerobic treatment of (waste)water with relatively high concentrations of lipidic compounds. In a container, influent is fed from the top and the container is equipped with a separation step at the bottom. Reactor contents are thoroughly mixed by a combined action of a gas lift loop and a liquid recycle over the reactor. The gas lift is called a "natural gas lift" and is provided by internal biogas production without the infeed of gas from a compressor or pump. However, the system has been found to operate slowly thereby being less effective.

One of the drawbacks in the known systems is flow regions with stagnant or very limited flow established, resulting in that the overall efficiency of the systems decreases. Furthermore, too high flow velocity inside the containers used may destroy the bio-film on the bio-film carriers, thereby limiting the cleaning effectiveness, and a too low flow velocity may result in the bio-films growing too much. Furthermore, in systems where gas such as air is to be inputted, there is often a problem related to efficient oxygenation of the liquids.

In addition to the above, it is often desireable to have a vivid motion of the bio-film carriers inside the container which motion should preferably include the individual bio-film elements not moving as in a fluidised bed configuration, but travelling throughout the entire volume of the container in which the bio-film elements are contained. Creation of such a vivid motion gives rise to at least two inter-connected problems (as untreated fluids have to enter the container, and cleaned fluids have to be extracted from the container), namely creation of the motion and extraction of liquids. This can be disclosed as the hydraulic load, HL, e.g. defined as a characteristic velocity squared, i.e. $HL \approx U^2$. In treatment systems aimed at by the present invention, the hydraulic load internally in the container should be high, whereas the hydraulic load on outlet (used to withdraw liquids from the container) should be considerably lower in order to prevent the withdrawal of liquids from the container from destroying, dictating or influencing the vivid motion aimed at the inside the container.

GB 2 315 264 discloses a wastewater treatment apparatus having a granular carrier separating duct and an outlet duct for discharging treated wastewater. However, the carrier separating duct and the outlet duct are arranged in a manner forcing the granular carriers downwardly while allowing fluids to move upwardly towards a weir behind which the outlet duct is provided. The separation of the liquids from granulates is thereby provided by gravitational/momentum forces, and the flow inside the container is highly influenced by the carrier separting duct and the outlet duct.

EP 2 394 966 discloses an apparatus for retention of (bio)solids for use in wastewater treatment. The apparatus disclosed comprising a vertically elongated effluent compartment equipped with two or more hoods connected to one or more riser tubes being open at the top and equipped with sludge deflection plates. The effluent compartment being equipped with a treated wastewater outlet system at the top part of the effluent compartment comprising one or more overflow wiers. The concept behind the device disclosed is that sludge rised through the hoods (due to gas lifting action) upwardly towards a deflection plate, pass the weir and into the outlet. While sludge is disclosed as moving upwardly and into the hoods, sludge is also recycled downwardly. This counter current recycling and gas lifting action highly limits the motion inside the container to very low velocities as higher velocities would otherwise destroy the gas lifting action. Thus, the device in EP 2 394 966 is only capable of producing a flow with a low hydraulic load.

WO 9603351 discloses an attempt to improve the efficiency of a biological treatment process. The process disclosed takes place in an open ended container with internal flow generation by use of gas addition to generate mixing inside the container. While the process and device disclosed therein indeed is considered as a step towards a more efficient biological treatment process, the process may be seen as still having some critical drawbacks. In the apparatus disclosed, the collection of treated water is performed through a single outlet provided in the container wall, at a position below the upper end of a centrally arranged tube. A slanted screen is provided in front of the outlet. This arrangement may have a tendency to skew the flow inside the reactor to an extend that could generate regions of stagnating flow (regions where no flow occurs).

US 2012/0152831 discloses an apparatus for cleaning wastewater. The apparatus comprises a throughput tank having a filler material to which microorganisms are adhered and wherein the throughput tank is ventilated with an oxygen containing gas. The inflow of wastewater into the throughput tank and the ventilation of the throughput tank is affected from bottom of the throughput tank and in such a gas amount, that the wastewater and the filler bodies suspended therein are mixed and the microorganisms on the filler bodies are supplied with sufficient oxygen. On the upper circumference of the throughput tank, drainage slits for the cleaned wastewater are provided. An overflow weir is also provided at the upper circumference of the throughput tank which weir surrounds the throughput tank at the upper end below the drainage slits like a collar. The apparatus is well suited for used with filler bodies being suspended in the fluid (the density of filler bodies and fluid are substantially equal). If a vivid up-downwardly motion of the filler bodies is realised, this would result in the volume flow through the weir becoming uncontrollable as the volume flow is governed by $Q \approx LH^{2/3}$, where L is the length of the weir and H is the height about the crest. Further, as the apparatus does not allow for any controlled downward motion of the filler material, these filler materials would be dragged towards the weir potentially blocking the wier over time.

Hence, improved methods, devices and systems for biological treatment of liquids such as water would be advantageous, and in particular more efficient and/or reliable methods, devices and systems would be advantageous.

OBJECT OF THE INVENTION

It is a further object of the present invention to provide an alternative to the prior art.

In particular, it may be seen as an object of the present invention to provide methods, devices and systems that solve the above mentioned problems of the prior art.

Further, it may be seen as an object of the present invention to provide a treatment of liquids where the hydraulic load inside a reactor is sufficiently high to renew a film of microorganisms on bio-film carriers while allowing efficient collection of treated fluids from such a reactor.

SUMMARY OF THE INVENTION

Thus, the above described object and several other objects are intended to be obtained in a first aspect of the invention by providing a container for biological treatment of liquids such as water. The container may typically comprise
  a bottom, one or more side walls,
  a liquid inlet for inletting liquid to be treated into the container,
  at least one vertically orientated tube arranged in the container, the lower end of said tube being raised above the bottom of the container,
  a first gas supply arranged at the lower end of said tube for creating a first circulating flow ($F_1$) of liquids and bio-film carriers through the vertically orientated tube,
  a second gas supply arranged at the bottom and in the vicinity of the wall(s) of the container for creating a second circulating flow ($F_2$) of liquids and bio-film carriers.

The gas introduced through the first and/or second gas supply may be atmospheric air which may be enriched with oxygen.

As presented herein, the first gas supply is arranged at the lower end of said tube and producing gas bubbles entering into the tube, preferably through openings provided in the tube at the lower end thereof, the gas bubbles raising upwardly inside the tube for creating a first circulating flow ($F_1$) of liquids and bio-film carriers rising upwardly through the vertically orientated tube.

As presented herein, the second gas supply is arranged at the bottom and in the vicinity of the wall. This position is well understood and clearly defined to a skilled person (inter alia derivable from the function, namely to create a flow in a stagnant liquid region by provided a second circulating flow), and used to avoid misunderstandings based on e.g. "in the corner" as this position refers to a geometrical singularity. However, the position "at the bottom and in the vicinity of the wall" means that the second gas supply is arranged at the intersection between the side wall(s) of the container and the bottom of the container. In many situation, this translates into the bottom corner(s) of the container. Typically, the position referred to may be a region inside the container with a cross section adjoining the wall and bottom of the container and having a height and width smaller than $\frac{1}{10}^{th}$ of the total height of the container.

Accordingly, the second gas supply is preferably arranged at the intersection between the one or more side walls of the container and the bottom of the container for introduction gas bubbles and thus creating a second circulating flow ($F_2$) of liquids and microfilm carriers towards an upper end of the container.

Thereby, a container according to the present invention is configured so that, during use, the upwardly directed first circulating flow ($F_1$) through the vertically arranged tube and the upwardly directed second circulating flow ($F_2$) in the vicinity of the wall of the container will, when they approach the top of the container, be diverted towards each other and the interaction between the two flows will result in the flow being turned 180° and flow towards the bottom of the container, and at the bottom of the container, the flow is split into a flow towards the wall of the container and a flow going into the vertically arranged tube; thereby two separate first and second circulating flows ($F_1$, $F_2$) are established.

The various air (gas) supplies disclosed in connection with the present invention may typically be considered as aearation means as they typically besides creating a certrain flow pattern also perform an aerating of the fluid inside the container.

The container may preferably comprise an outflow channel extending along, and preferably throughout, a perimeter of an upper part of the container wall, the outflow channel having a fluid penetrable wall section facing inwardly so that fluids may flow from the interior of the container, through the fluid penetrable wall section and into the outflow channel and an outlet for leading fluids, typically and preferably being liquids, such as treated liquids, out from the outflow channel.

Thus, the invention creates two circulating flows internally in the container, where the first circulating flow goes through the vertically arranged tube. These circulating flows move the bio-film carriers around inside the container. As the liquid is treated, it has to be taken out of the container to allow for new, untreated liquid to be introduced into the container. In connection with the present invention, it has been found that design of a suitable outlet from the container, an outlet that does not influences the flow (e.g. by creating drains) inside the container and at the same time prevents the bio-film carriers to be discharged from the container with the liquids, is not a straight forward design procedure.

The inventors have solved the outlet problem by providing an outflow channel extending along and preferably throughout, a perimeter of the upper part of the container wall, the outflow channel having a fluid penetrable wall section allowing liquids to go through while stopping bio-film carriers from go into the outflow channel. At the same time, clogging of the fluid penetrable wall section by bio-film carriers is prevented as the two circulating flows created in the container extend up to and past the fluid penetrable wall section whereby the circulating flow will "wash away" bio-film carriers that would settle at the fluid penetrable wall section.

Other advantageous effects will be disclosed below.

"Arranged at the lower end of said tube" is used to designate that the gas supply is arranged relatively to the lower end of the tube either below the end or on the wall of the tube adjacent to the end. The lower end of the tube is preferably considered to be a region extending upwardly from the lower end of the tube less than 1 diameter, such as less than ½ diameter, preferably less than ¼ diameter of the tube.

"Along a perimeter of an upper part of the container wall" is used to designate that the outflow channel extends adjacent to the wall of the container, preferably internally in the container. In many preferred embodiments this includes that the wall(s) of the outflow channel is partly provided and delimited partly by the upper part of the wall of the container. Accordingly, the interior of the outflow channel most often adjoins the wall of the container.

Figure 2A:
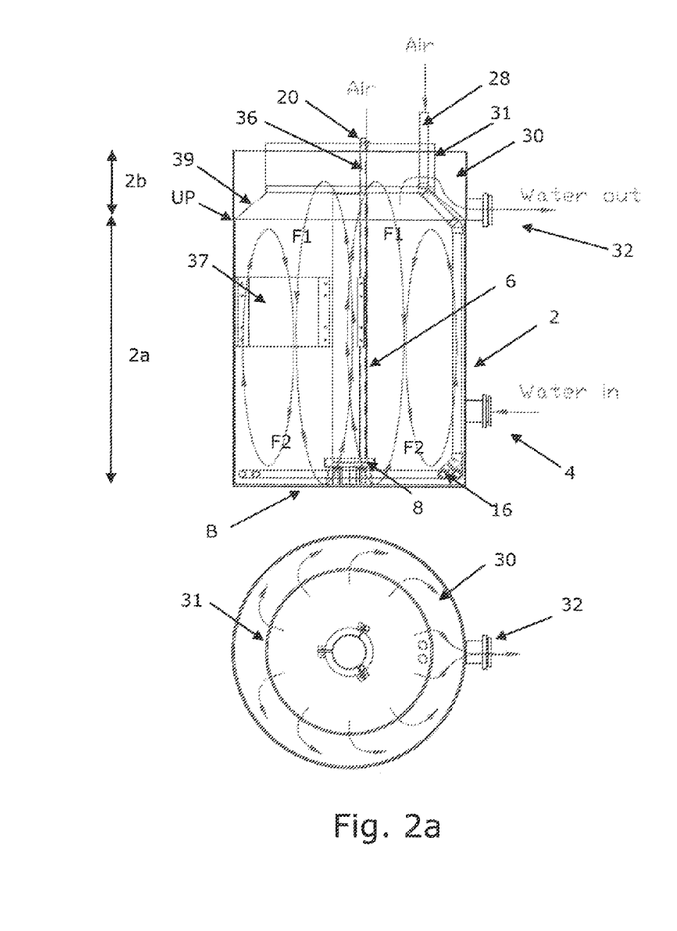
FIGS. 2*a-e* show five preferred embodiments of a container for biological treatment according to the present invention; the upper part of the figures show a cross sectional view and the lower part of the figures show a top-view.

By "upper part of the container wall" is meant the part of the container wall extending from the upper end of the container wall and downwardly to the lower most vertical position of the outflow channel (cf. e.g. FIG. 2a, reference UP). "upper part of container" follow directly from this definition.

It is noted that "part" does not necessarily mean a separate part, but is used to denote a section of an item. "Element" is used to denote an item, that preferably is a separate item, which often is attached to another item or used as a stand-alone item.

Fluid penetrable wall is used to denote a wall which forms discrimination means in the sense that fluids may pass through the wall but bio-film carriers are detained. The fluid penetrable wall is typically established by penetrations being provided by bores of a pre-selected size, mesh with pre-selected mesh size, a number of slits with preselected slit size or the like, for detaining the biofilm carriers in the container while still allowing fluids to pass though; the openings provided thereby are thus smaller than the bio-film carriers.

In some preferred embodiments, the term "first air supply" is used instead of "first gas supply" (similarly for second gas supply) in order to refer to a preferred embodiment in which the gas supplied is air. In structural sense, the terms "first gas supply" and "first air supply" may be used interchangble.

Closed container is preferably used to mean a container having inlets and outlets through which fluids are added to the container and extracted from the container, and which defines a fluid tight enclosure except from these inlets and outlets. Contrary to a closed container, an open ended container is preferably considered to constitute a tube with a bottom but with no upper end lid. Preferred embodiments of the invention may comprise both open ended container(s) and closed container(s).

A vertically orientated tube is preferably used to mean a tube having a longitudinal extension, being parallel to the direction of the gravity when in use. In case of a cylindrically shaped tube, the longitudinal extension is the axis of symmetry of the tube. It is noted, that the term tube and tubular shaped is to be construed in a broad context not only meaning a cylindrical body having a circular cross section, but also including a tubular body with other cross sections, such as square shaped, triangular, or in general polygon shaped. The tube is preferably made from a material being non-penetrable to fluid(s).

Vertically orientated and vertically arranged are used interchangeable herein.

Funnel shape is preferably used to mean a tube with a decreasing or increasing cross section. In many embodiments, the cross section may by circular, but the term "funnel shape" is not intended to be limited to tubes with circular cross sections.

Circulating flow is preferably used to mean a flow going around e.g. the vertically orientated tube in a manner where fluids go through the tube internally in the tube.

Bio-film carriers is preferably used to mean elements having surfaces on which a microfilm may be formed, which microfilm plays a major role in the treatment process and is preferably formed by micro-organisms. Bio-film carriers and microfilm carriers are used interchangeable herein.

Airlift is preferably used to mean combination of a vertically orientated tube and the gas supply arranged at an end of the tube as disclosed herein.

Diameter as used herein is used in a conventional manner meaning e.g. for quantifying the size of a cross section and if the cross section deviated from circular, the diameter referred to is the equivalent diameter: D=4*Area/length of perimeter.

Creating a flow in a stagnant liquid region is preferably used to mean that a flow is created in a region of a container which would —if the flow was not created —be a region with stagnant flow.

Liquid is preferably used to mean substances in liquid phase. Liquid is in many of the preferred embodiments water, such as nutrient contaminated water, wastewater in general, or the like. Fluid is used in its ordinary sense to cover a substance in liquid or gas phase. In many of the embodiments disclosed herein, the fluid is in liquid phase, such as the fluid being treated is a in liquid phase.

The flow internally in the container in relation to the flow out through the fluid penetrable wall, is preferably provided so that a mean downward fluid velocity is larger than a mean fluid velocity out through the fluid penetrable wall. The mean downward fluid velocity is preferably considered to be the average velocity of the two circulating flows $F_1$ and $F_2$ at the vertical position at which the two circulating flows have substantially only a vertical downward velocity. The mean fluid velocity out through the fluid penetrable wall is preferably considered to be the volume flow out through the fluid penetrable wall divided by the opening area in the fluid penetrable wall. As presented in further details herein, the flow internally in the container and thereby also the provision of the flow disclosed above, may preferably be determined at least inter alia by the introduction of gas/air through the gas supplies.

In a second aspect, the invention relates to a system for biological treatment of liquid such as water, the system comprises a plurality of containers according to a first aspect of the invention, for treatment of the liquid(s) with, typically different, purification techniques. The containers are preferably serially connected so that an inlet of a downstream container is connected to an outlet of an upstream container, thereby enabling that liquid(s) leaving said upstream container through the outlet, enters into said downstream container through its inlet. However, they may also be arranged in parallel, or even arranged in a system comprising parallelly and serially connected containers.

In a third aspect, the invention relates to a system for biological treatment of liquid(s) such as water, the system comprises a plurality of closed containers for treatment of the liquid(s) with, typically different, purification techniques, the containers being preferably containers according to a first aspect of the invention. The containers are preferably serially connected so that an inlet of a downstream container is connected to an outlet of an upstream container, thereby enabling that liquids leaving said upstream container through the outlet, enter into said downstream container through its inlet. The most upstream container is typically connected to a source of liquid(s) to be treated and the most downstream container is typically connected to a deposition site, such as a tank, or handled in an ordinary manner for treated liquid(s).

In a fourth aspect, the invention relates to a method for treatment of liquids, which method preferably utilises a system according to three aspects above. In methods according to the fourth aspect, untreated liquid(s) is (are) led into a container containing bio-film carriers on which a microfilm is growing, said microfilm generates the intended decomposition of the contamination contained in the liquid (s), and during which method a circulating flow of liquid(s) and microfilm carriers is created in the container having an area with a concentrated flow in which a concentration of the microfilm carriers takes place.

Further embodiments of the invention are presented in the following and in the accompanying drawings and claims.

The first, second, third and fourth aspect of the present invention may each be combined with any of the other aspects. These and other aspects of the invention will be apparent from and elucidated with reference to the embodiments described hereinafter.

BRIEF DESCRIPTION OF THE FIGURES

The present invention and in particular preferred embodiments thereof will now be disclosed in further details with reference to the accompanying drawings in which.

DETAILED DESCRIPTION OF PREFERRED EMBODIMENTS

In the following similar such as identical elements and parts between different embodiments are indicated with same numerals throughout this description.

Figure 1:
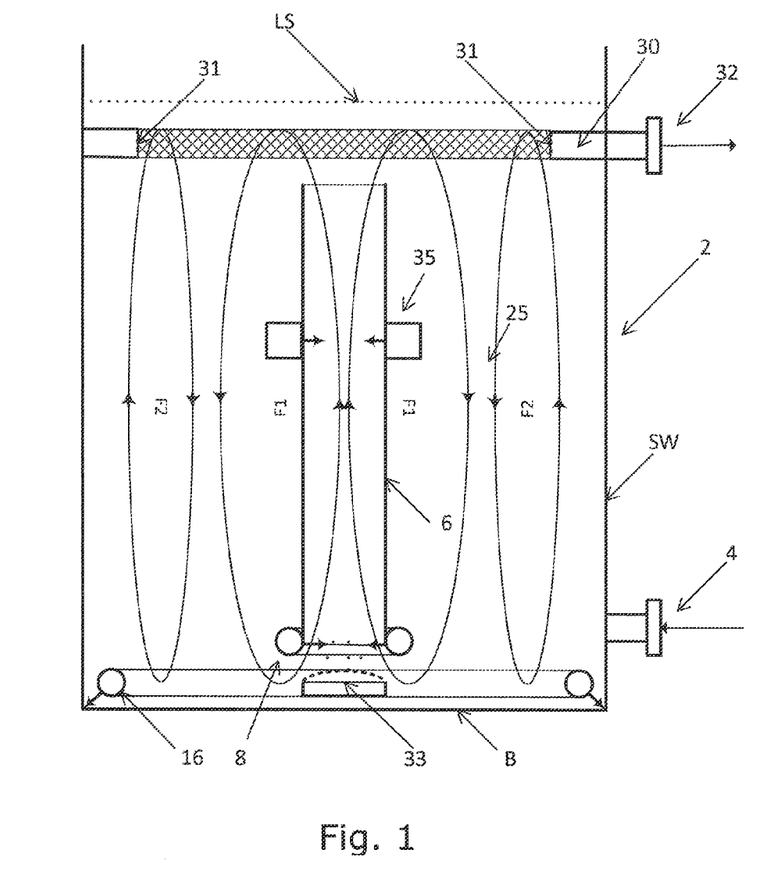
FIG. 1 shows schematically in a cross sectional side view a container for biological treatment of liquid(s) such as water according to a first embodiment of the present invention.

With reference to FIG. 1, a container 2 for biological treatment of liquid such as water according to the present invention is disclosed. The container 2 is open ended at the upper end. Inside the container 2, liquid to be treated is, at least during use of the container 2, present together with bio-film carriers as disclosed in FIGS. 2-13 in WO 9603351 which content hereby is incorporated. The bio-film carriers are preferably elements having an outwardly open cell structure for increasing the overall surface of the particles and/or the bio-film carriers are elements having a mineral grain-like structure or having a cave-like surface structure like the pattern on a golf ball.

As shown in FIG. 1, the container for biological treatment of liquids such as water comprises a bottom B and one or more side walls SW forming the outer side of the container. It is noted that the side wall and bottom are joined (if not made integral with each other) in a fluid tight manner.

In the preferred embodiment disclosed, a liquid inlet 4 for inletting liquid to be treated into the container 2 is provided in the side wall at a lower position of the container 2 to inlet liquid at a position above the bottom but in the region of the bottom. Alternatively, the liquid inlet may be provided at another position.

At least one vertically orientated tube 6 is arranged in the container 2. The lower end of the tube 6 is raised above the bottom of the container 2 to allow liquid to flow into the tube from below.

A first gas supply 8 is arranged at the lower end of said tube 6 for creating a first circulating flow $F_1$ of liquid and bio-film carriers through the vertically orientated tube. The first gas supply 8 is preferably formed as a torus shaped element having bores provided in the wall of the element facing the interior of the tube 6. When gas, such as air, is supplied to the first gas supply 8, the gas will flow out through the bores in the direction indicated by arrows running out from the first gas supply 8 in FIG. 1. Alternatively, the first gas supply 8, may comprise a tube having an outlet arranged internally in and at the lower end of the tube 6 through which gas, such as air, is supplied.

The gas or air which is fed to a first gas supply 8 produces gas bubbles in the container 2 rising upwardly in the liquid contained in the container 2 inside the vertically arranged tube 6. The vertically arranged tube 6 is in the preferred embodiments shown in the figures shaped with circular cross sections, although the vertically arranged tube 6 may have other cross sections, such as square, triangular or in general polygonal. This upwardly going motion generates circulating flow being an internal recirculating of liquids, with an upwardly going motion inside the vertically arranged tube 6 and a downwardly going motion outside the vertically arranged tube 6. In FIG. 1 this circulating flow is indicated by the arrows labelled F1.

As indicated in the figure, the first gas supply 8 is arranged internally in the container 2 and at the lower end of the vertically arranged tube 6. The combination of the vertically arranged tube 6 and the first gas supply 8 is termed an airlift. In operation, a circulating flow of liquid and microfilm carriers is created by the airlift in the container having an area with a concentrated flow in which a concentration of the microfilm carriers takes place. This concentrated flow is typically within the vertically arranged tube 6.

That the first gas supply 8 is arranged at the lower end of the vertically arranged tube 6 means in many preferred embodiments that the gas enters into the tube 6 through openings provided in the tube 6 at the lower end thereof. By lower end is preferably meant that the openings are arranged no further away from the end of the tube than 1 diameter of the tube, such as a ½ diameter, preferably ¼ diameter.

The openings are preferably equally distributed (with equal distance between them) in one or more a horizontal proceeding perimeters of the tube. Thus, the openings may be seen as being distributed in one or more rows where each row is aligned with a single horizontal plane.

While the first gas supply 8 together with the vertically arranged tube may create a circulation flow in the container 2 resulting in that a good mixing in the container, stagnant flow regions may still be present in the container, such as stagnant flow regions in the corners of the container 2 and along the side wall of the container 2. In order to seek to avoid such stagnant flow regions, the container comprises a second gas supply 16 arranged at the bottom and in the vicinity of the wall(s) of the container 2. This gas supply 16 receives gas such as air from a gas source and is a torus shaped element having bores provided in the wall of the element facing the lower corner(s) of the container 2. The gas supplied will flow out through the bores in in the direction indicated by the arrows running out from the second gas supply 16 thereby creating a second circulating flow $F_2$ of liquids and microfilm carriers.

The upper part of the container 2 comprises an outflow channel 30 extending along, and preferably throughout, a perimeter of an upper part of the container 2. The outflow channel 30 having a fluid penetrable wall section 31 facing inwardly so that fluids may flow from the interior of the container, through the fluid penetrable wall section and into the outflow channel 30. Fluids flowing into the outflow channel 31 may be discharged from the channel—and thereby from the container 2—through an outlet 32 provided in the container for leading fluid out from the outflow channel 30.

As indicated in FIG. 1, the container 2 is open ended thereby exposing the liquid surface LS to the surroundings. Thereby, gas produced in and/or supplied to the liquid may be discharged at the liquid surface LS. The open end of the container may be closed by a lid having a gas discharge outlet which may be connected to a downstream equipment, if, for instance, collection and/or treatment of the gasses is necessary.

As shown inter alia in FIG. 1, the region in between the fluid penetrable wall section (31) being devoid of obstacles, so as to allow the two circulating flows, $F_1$, $F_2$, to extend up to and preferably also passed the fluid penetrable wall section.

A container according to the present invention may further comprise a micro-bubble diffuser 33 arranged below the lower end of the vertically arranged tube 6 as indicated in FIG. 1. Such a micro-bubble diffuser 33 is adapted to produce gas bubbles 34, such as air bubbles, preferably in the micro-size range by having a surface with small pores through out which the gas or air is flowing. A micro-bubble diffuser 33 is typically used to improve the container's 2 ability to transfer oxygen to the liquid to be treated and arranged below the lower end of the vertically arranged tube 6.

As also indicated in FIG. 1, a container 2 according to the present invention may also comprise a booster 35 injecting gas such as air into the interior of the vertically arranged tube 6 as indicated by the arrows in FIG. 1. The booster typically comprising a flow channel encircling the vertically arranged tube 6 and bores being provided allowing gas to flow out of the channel and into the interior of the vertically arranged tube 6. By applying gas such as air to the liquid present in the interior of the vertically arranged tube 6 at a position above the lower end of the tube, the flow of liquid may be boosted in the sense than momentum can be added to the liquid by the upgoing (buoyancy driven) motion of the gas bubbles. The booster 35 is typically adapted to inject gas such as air into the interior of the vertically arranged tube 6 at a position raised above the lower end of the vertically arranged tube.

The vertical position of the booster should in many instances be set based on experiments in order to achieve the most optimal position, although the following figures give some specific examples on suitable positions of the booster 35.

Reference is made to FIG. 2*a-e* which each shows a preferred embodiment according to the present invention. It is noted, that the legends used in FIG. 2*a-e* refer to "water" as liquid to be treated and "air" being introduced. However, other liquids than water and other gasses than air may be used. As shown in these figures, the container preferably has a section of the side wall of the container 2 below the upper part which is tubular shaped, such as cylindrically shaped as shown in FIG. 2*a-e*, and has a disc-shaped bottom B. The sidewall SW and the bottom B being made from fluid tight materials, such as being made from a suitable metal which may be coated by paint or other container. The bottom B and the side wall SW is typically welded together.

Figure 2B:
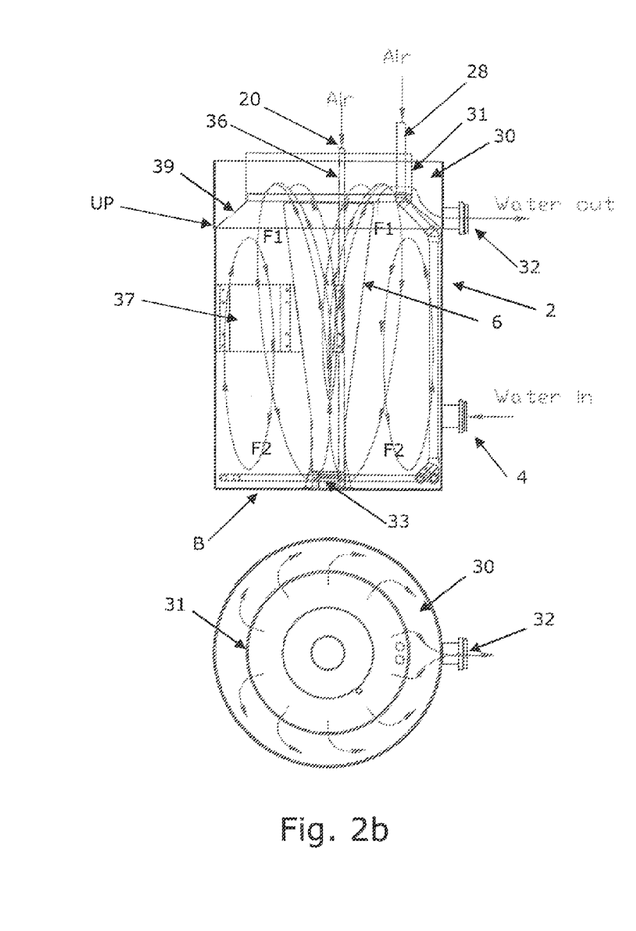
Figure 2C:
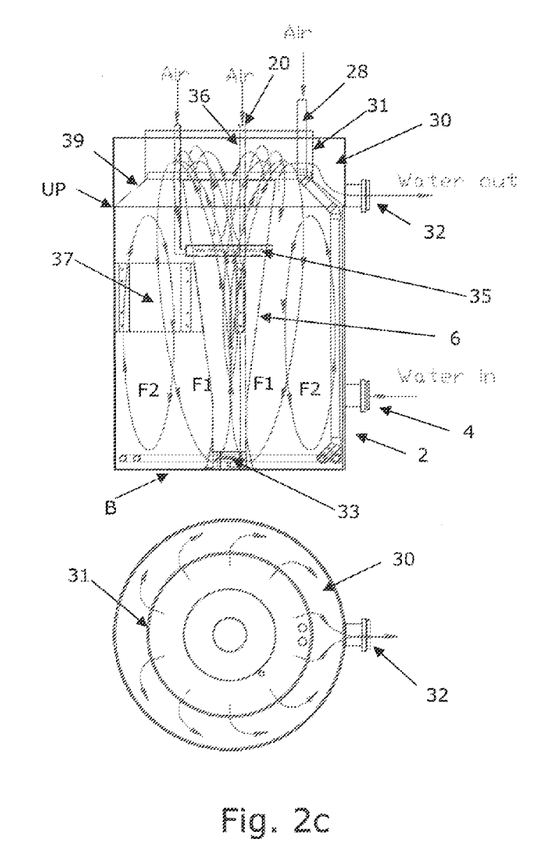

All the embodiments shown in FIG. 2*a-e* comprise a vertically orientated tube 6 where the lower end of said tube is raised above the bottom of the container 2, and a first gas supply 8 arranged at the lower end of said tube 6 for creating a first circulating flow $F_1$ of liquid and bio-film carriers through the vertically orientated tube 6. The embodiment of FIGS. 2*b* and 2*c* are shown as not containing a first gas supply 8 as in FIG. 1, but with a micro bubble diffuser 33 taking the place of the first gas supply 8. However, the embodiments of FIGS. 2*b* and 2*c* may also be equipped with a first gas supply 8 as the one shown in e.g. FIG. 1.

The container 2 comprises an air conduct 36 through which air is supplied to the first gas supply 8. The vertically arranged tube 6 is supported within the container by a support structure comprising a plurality of plate shaped elements 37 extending horizontally from the outer surface of the vertically arranged tube 6 to the interior surface of the side wall SW. The plate shaped elements 37 are arranged so that the surface of the plates extends vertically and with equal angle between them, thereby forming a star-configuration when seen from above. Besides providing the effect of supporting the vertically arranged tube 6, the plate shape elements may straighten the flow in the sense that the plate may assist in removing horizontal rotation in the flow. The plates shape element 37 may be inclined relatively to vertical which may introduce horizontal rotation in the flow.

Further, the embodiments of FIG. 2a-e all have a second gas supply 16 arranged at the bottom and in the vicinity of the walls of the container 2 for creating a second circulating flow $F_2$ of liquid and microfilm carriers. This second gas supply receives gas (air) through a supply tube 38. Liquid goes into the containers 2 through inlet 4 and leave the containers 2 through outlet 32.

Reference is now made to FIG. 2a-d. In these embodiments, the upper part 2b of the container 2 has a funnel shape part 39 extending in a contracting manner from an upper position of the sidewall UP to the fluid penetrable wall section 31. As shown in FIG. 2a-d, the upper part of the side wall SW extends cylindrically upwardly from the upper position UP and the upper part of the side wall encircles the funnel shape part 39 and the fluid penetrable wall section 31. Thereby, the outflow channel 30 is provided and delimited by the upper part of the side wall, the funnel shaped part 39 and the fluid penetrable wall section 31.

With reference to FIG. 2a-e, the fluid penetrable wall section 31 is tubular shaped, and as indicated in FIG. 2a-d preferably being cylindrically shaped. Furthermore, fluid penetrable wall section 31 forms discrimination means, typically established by the penetration being provided by bores of a pre-selected size, for detaining the biofilm carriers 10 in the container.

An advantageous feature of the present invention is that the various air/gas supplies, that is the first gas supply 8 and second gas supply 16, the micro bubble diffuser 33 and the booster 35 may receive gas such as air separately controllable, in the sense that the amount of gas flow to each of the air/gas supplies may be controlled individually and typically varied over time. Thereby, the flow condition inside the container 2 may be controlled to meet certain demands.

In the embodiment of FIG. 2a, the vertically orientated tube 6 is cylindrically shaped throughout its length. The combination of a cylindrical vertically orientated tube 6, a funnel shape part 39 and controllable air (or in general gas) supplies has been found to improve the liquid flow inside the container 2 with respect to optimal biological conversion capacity.

Figure 2D:
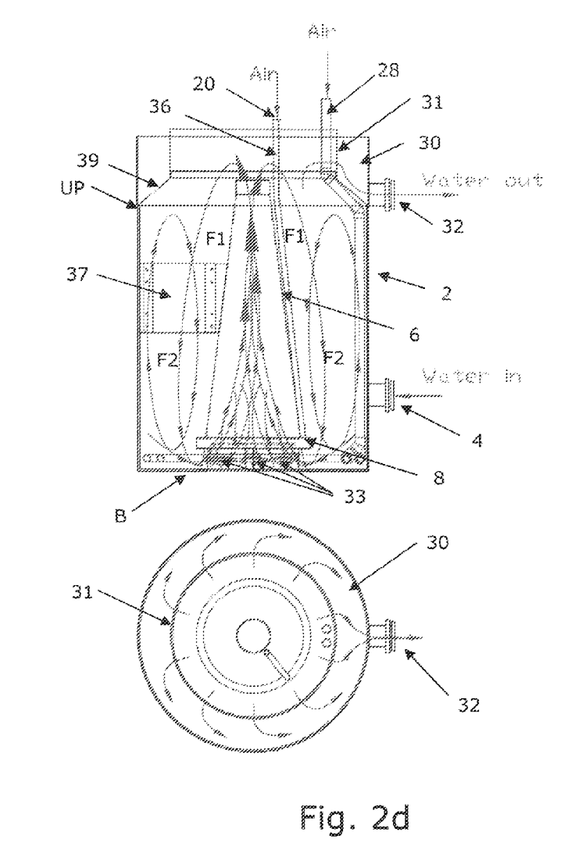

In the embodiments shown in FIGS. 2b, c and d, the vericatically arranged tube 6 has a section being funnel shaped.

Reference is made to FIGS. 2b and c, each showing an embodiment in which the funnel shape section widens in a direction towards the upper end of the container 2. The embodiments shown in these two figures also comprise a micro bubble diffuser 33 as disclosed above. The micro bubble diffuser 33 is arranged below the lower end of the vertically arranged tube 6 and receives gas or air from an external gas source (that is a source arranged outside the container 2, e.g. a blower, compressor or a vessel storing compressed gas). The external source may be used for both the micro bubble diffuser 33, the first gas supply 8 and second gas supply 16, but separate gas sources may be used for each of these gas supplies 33, 8, 16. The embodiment shown in FIG. 2c, further comprises a booster 35 typically arranged at a vertically position at ⅔ of the total height of the water column (that is typically around ⅔ of the height of the container 2, but other positions are considered with the scope of the present invention).

With reference to the embodiment shown in FIG. 2b, the combination of a widening vertically orientated tube 6 having its most narrow section at the bottom B, a funnel shape part 39 and controllable air (or in general gas) supplies has been found to improve degassing of the liquid while maintaining or even improving the ability to perform a biological cleaning the liquid flow inside the container 2 and it has been found to improve the liquid flow inside the container 2 with respect to optimal biological conversion capacity.

With reference to FIG. 2c, which shows an embodiment similar to that of FIG. 2b except that booster 35 is provided, has been found to provide similar effects as what is provided by the embodiment of FIG. 2b, and the booster 35 has been found to increase the capacity of liquid and carriers being pumped through the vertically arranged tube 6 by the first air supply 8.

It is noted, that although the embodiments disclosed in FIGS. 2b and c are disclosed as comprising a micro bubble diffuser 33, this is considered to be an optional feature which advantageously may be applied in cases where the aim is increased oxygen transfer.

Reference is now made to FIG. 2d which shows an embodiment of the invention in which the funnel shape section of the vertically arranged tube 6 widens in a direction towards the bottom of the container 2. Optionally, a plurality of micro bubble diffusers 33 may be applied below the widest portion vertically arranged tube 6 as shown in FIG. 2d. It has been found that by arranging the widest portion of the vertically arranged tube 6 at the bottom of the container 2, the ability to keep the bio-film carriers clean during strong organic load increases while maintaining the biological cleaning or even increases the biological cleaning.

Figure 2E:
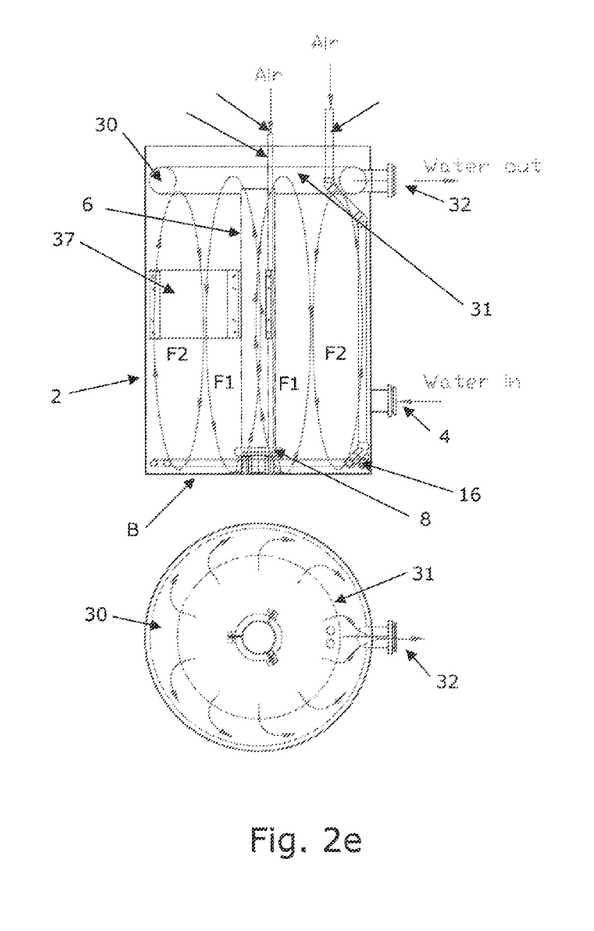

Reference is made to FIG. 2e, which shows an outflow channel 30 being different from those shown in FIG. 2a-d. In FIG. 2e, the outlet flow channel is tubular shaped, preferably torus shaped, and the wall of the outlet flow channel 30 is made fluid permeable to allow fluid (such as treated liquid) to flow into the channel. As shown in FIG. 2e, the container may comprise a first and second air supply 16 and —not shown— one or more micro bubble diffusers 33 and boosters 35 may be applied similarly to what is disclosed above. The torus shaped outflow channel 30 has shown to secure an evenly distributed outflow from the container 2, which together with the vertically arranged tube 6 with first air supply 8 and control of the air supply, increases the possibilities to control the flow internally in the container which may improve the ability to biological cleaning, aeration and degassing.

It is noted, that although the embodiments shown in FIG. 2a-e are shown to have a specific configuration, a feature shown in connection with one embodiment may be applied to other embodiments; except that the vertically arranged tube 6 cannot at the same time be funnel shaped and cylindrical. However, the vertically arranged tube could be may double funnel shaped in the sense that it contains a contraction along the vertical direction of the tube.

Further, and with reference to FIG. 2e, the region in between the fluid penetrable wall section (31) being devoid of obstacles except from a part of the vertically orientated tube (extending up into the region in between the fluid penetrable wall section), so as to allow the two circulating flows, $F_1$, $F_2$, to extend up to and preferably also passed the fluid penetrable wall section.

As disclosed herein, the first gas supply 8 is typically an adjustable supply of gas e.g. air/oxygen up through the vertically orientated tube 6, the first gas supply 8 preferably receiving gas via a first inlet 20 (see for instance FIG. 2a) and the first gas supply 8 is arranged internally in the container 2 and at the lower end of the vertically orientated tube 6 in a manner where gas is introduced into the interior of the vertically arranged 6 at the lower end thereof. When a single vertically arranged tube is applied, the vertically orientated tube 6 is most often arranged in the centre of the container 2.

The container is preferably cylindrical. However, the container may be given other shapes such as having polygonal shape.

The distance between the lower end of the vertically orientated tube 6 and the bottom of the container is preferably below 1 diameter of the vertically orientated tube 6, such as a below ½ diameter, preferably below ¼ diameter, the diameter being determined as the hydraulic diameter in cases where the cross section is not circular, at the lower end of the vertically orientated tube.

As disclosed herein, the container 2 comprises a second gas supply 16, preferably supplying atmospheric air or oxygen at the bottom of the container for creating a flow in a stagnant liquid regions, preferably near the bottom in the vicinity of the side wall of the containers. This creates the second circulating flow F2 (see e.g. FIG. 1).

The first gas supply 8 and the second gas supply 16 are in many preferred embodiments torus shaped tubes with inlet connections for inletting gas and having openings allowing the gas to flow out. In the first gas supply 8, the openings through which the gas flows, direct the gas bubbles into the vertically arranged tube 6. The openings of the second gas supply 16, directs the gas downwardly towards the corner of the container (see FIG. 1). Alternatively, or in combination thereto, the second gas supply 16 may be in the form of a pipe with nozzles.

In preferred embodiments and as disclosed herein, the first gas supply 8 receives gas produced in the container via inlet leading gas to the first gas supply 8 (e.g. inlet 20 in FIG. 2a) whereby the recirculation is provided. The recirculation may be assisted by a blower (not shown). The second gas supply 16 may also receive gas produced in the container via an inlet (e.g. 28 in FIG. 2a). Thus, the second gas supply 16 preferably takes part in the recirculation. It should be noted, that the terms inlet and outlet should be interpreted in a broad context e.g. as two or more connections (as indicated in FIG. 2a: one for second gas supply 16 and one for the first gas supply 8) may form the inlet. Similarly, the outlet should be interpreted in a broad context. Furthermore, gas, such as air, oxygen or oxygen enriched air from a gas source may be mixed into the recirculated gas and/or gas from the source may be fed to the first or second gas supplies instead of the recirculated gas.

The embodiments disclosed in the figures show the container as an open ended container 2 thereby allowing discharge of gas. However, the container 2 may comprise a gastight top equipped (the top seals the upper end of the container to prevent discharge of gas through other openings than the gas outlet) with a possibility for off-gas (gas outlet), e.g. being gas produced in the container 2 and/or introduced into the container 2, collection and overpressure release.

The vertically arranged tube 6 is preferably adjustably raised a distance over the bottom of the container 2 for adjusting the flow of liquid and carriers towards and up through the tube 6. Typically, the vertically arranged tube 6 is arranged in the centre of the container 2.

During use, the treatment of liquids is typically carried out with a constant flow of liquid into and out of the container 2 through the liquid inlet 4 and the liquid outlet 32. However, the system may also be applied for a batch processing of liquids.

Reference is made to FIG. 1 which shows a container with the flow pattern produced in the container by the first gas supply 8 in combination with the second gas supply 16 (F1, F2). As outlined above, the air bubbles of the first gas supply 8 creates a circulating flow of liquid and bio-film carriers by the airlift (combination of vertically arranged tube 6 and first gas supply 8 in the container 1. The circulating flow having a region in which a concentration of the microfilm carrier (number of carrier per unit volume) takes place. This flow region is typically within the vertically arranged tube 6. In FIG. 1, this circulating flow is labelled $F_1$ and may be referred to as a first circulating flow.

The second gas supply 16 will also create a circulating flow being separate from the first circulating flow $F_1$. In FIG. 1, this second circulating flow is labelled $F_2$ and is created by the air bubbles introduced through the second air supply. The buoyancy force acting on the air bubbles will move the air bubbles towards the upper end of the container 1 and as the air bubbles are introduced in stagnant liquid regions, preferably near the bottom in the vicinity of the side wall of the container 1, the air bubbles will rise in the vicinity of the side wall of the container 1. As the air bubbles rise through the liquid in the container 1, they will act upon the liquid and micofilm carriers creating a flow of liquid and micro film-carriers following the path of the air bubbles. Similarly, the air bubbles rising though the tube 6 will create a flow upwardly through the tube 6.

Thus, the upwardly directed flow through the tube 6 and the upwardly directed flow in the vicinity of the wall of the container will, when they approach the closed upper part of the container (top of the container 1), be diverted towards each other and the interaction between the two flows will result in that the flow turn 180° and flow towards the bottom. In the bottom, the flow is split into a flow towards the wall of the container and into a flow going into the tube 6.

It is noted that in regions 25 where the two flows flow together, the two flows may be mixed into one flow. The container 1 is typically cylindrically shaped and the first and the second air supply 8, 16 distribute air bubbles substantially homogeneously along a circumference of a circle. Thus, in an overall perspective, two elliptic torus shaped flow patterns $F_1$ $F_2$ are created.

The dimensions of the two elliptic torus shaped flow patterns $F_1$ $F_2$ and the velocities of the flow may be controlled inter alia by the amount of air (or gas in general) introduced through the first and the second air supply 8, 16. In preferred embodiments, the following has shown to produce desirable results:

| | |
|---|---|
| Internal diameter of container 2 | 2-20 m |
| Level (the level is the height of the liquid coloum inside the container 2; often there is no airspace above the liquid in the container and the level thereby equals the internal height of the container) | 2-8 m |
| Mass flow of air to the first air supply 8 (nm3 means normal cubic meter) | 4-6280 Nm3/hr |
| Mass flow of air to the second air supply 16 (nm3 means normal cubic meter) | 4-6280 Nm3/hr |
| The distance between the bottom of the container and the lower end of the vertically arranged tube 6 | 0.2-0.4 m |

It is noted that all the air flowing to the air supplies 8, 16 goes into the container via the supplies preferably simultaneous whereby the first and the second circulating flow $(F_1, F_2,)$ are co-existing. Further, it is often preferred that the amount of air (or gas in general) flowing to the first air supply 8 and to the second air supply 16 are substantially equal. This means for instance that if a single first air supply 8 and a single second air supply 16 are present in the container 2, and the first air supply 8 receives 50 Nm3/hr then the second air supply 16 will also receive 50 Nm/hr. If more than one first air supply 8 is present in a single container 2 and a single second air supply 16 is present, then the total amount of air to the first air supply 8 is again equal to the amount of the second air supply 16; the total amount of air to the first air supply 8 is equally distributed among all of the first air supplies 8.

However it may be preferred to operate the first and/or the second air supply 8, 16 intermittently, such as alternatingly whereby the existence of the first circulating flow ($F_1$) and the second circulating flow ($F_2$) may become alternating.

Further, if biological growth becomes excessive, the relative ratios of gas supply may be increased in one and decreased in the other to provide enhanced turbulence in the airlift to provide improved cleaning of the biofilm carriers. Alternatively by using the booster 35 gas supply. The control may also be applied the other way around: decrease airlift gas supply to promote more growth on carriers. This is referred to as "Biofilm Control". Finally, the various control methods may be applied alternately.

Figure 3:
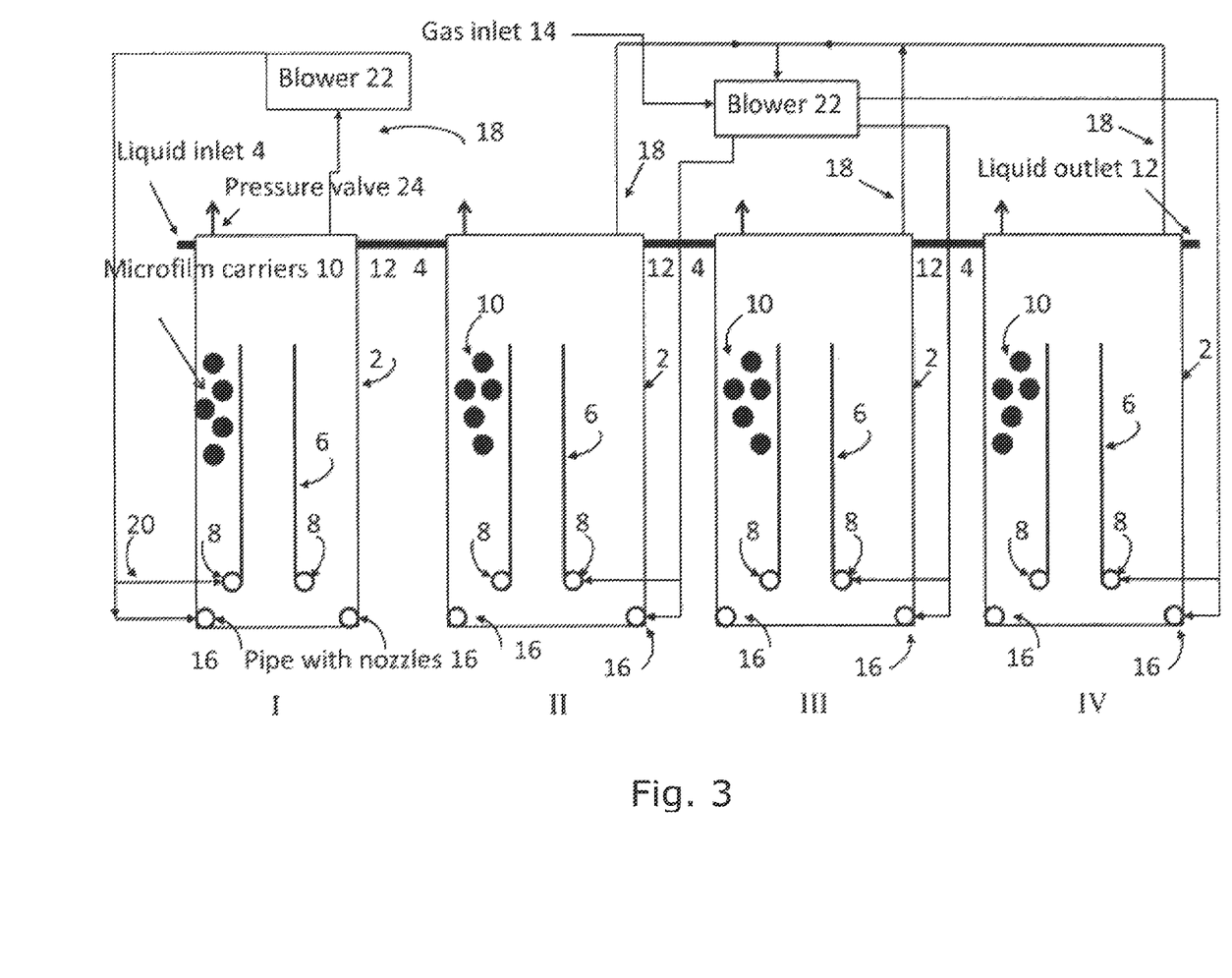
FIG. 3 shows schematically in a cross sectional side view a system for biological treatment of liquids such as water, the system comprising a plurality (such as four as shown) of serially connected containers, FIGS. 4*a-d* each show schematically a preferred embodiment of a container with airlift(s), the figures show the container from above with only the vertically arranged tube of the airlift shown for clarity reason only.

The invention also encompasses a plurality of the containers 2 disclosed herein for treatment of liquid with different purification techniques as shown in FIG. 3. The containers 2 are preferably and typically containers as disclosed herein and e.g. with reference to FIGS. 1 and/or 2. As shown in FIG. 3, the containers are serially connected so that an inlet 4 of a downstream container is connected to an outlet 12 of an upstream container, thereby enabling that liquid leaving said upstream container through the liquid outlet enters into said downstream container through its inlet. Further, the container disclosed in FIG. 3 is shown as a closed container 2, however it may be embodied as an open ended container 2.

Recirculation of gas produced in the containers 2 and optionally further gas added is also applied in the system of serially connected containers 2.

The configuration shown in FIG. 3 is designed towards a de-nitrification followed by a nitrification. The de-nitrification is carried out in the first container labelled I in FIG. 3. This container is configured so that the gas recirculated from first outlet 18 to first inlet 20 is only gas produced in the container 2 (the container labelled I). After the de-nitrification has been carried out, the liquid flows out of the liquid outlet 12 and into the downstream container II through inlet 4. After its passage through container II the liquid flows into container III and finally into container IV. The most upstream container is typically connected to a source of liquid to be treated and the most downstream container is typically connected to a deposition site, such as a tank, or handled in an ordinary manner for treated liquid.

Preferably, recirculation of treated water from an aerobic treatment carried out in a container according to the present invention is recirculated to a first de-nitrification process carried out in a container according to the present invention in order to add nitrate produced in the aerobic processes.

The three containers II, III and IV have a common recirculation system provided by the first outlets 18 and are connected to a common blower which feeds the gas to all three first inlets of the three containers II, III, IV and thereby to the first and the second air supplies 16, 8. The processes carried out in the three containers II, III, IV are primarily aerobic processes, such as a nitrification process requiring oxygen. Gas such as oxygen or oxygen enriched air 14 is added to the gas produced in the containers 2 (that is containers II, III and IV). This is indicated in FIG. 2 by the arrow labelled gas inlet leading to the blower.

However, it is envisaged, that the three containers 2 II, III, IV may each have their own recirculation system and its own gas supply if this is desired, e.g. to optimise the amount of oxygen added to the liquid in the containers.

Furthermore, the number of containers shown in FIG. 3 is exemplified with one container 2 for the de-nitrification process and three for the nitrification process. Depending on the need for treatment, these numbers may be varied individually. In addition, the invention does not prevent other treatment processes to be performed inline with the disclosure presented herein.

Figures 4A, 4B, 4C, 4D:
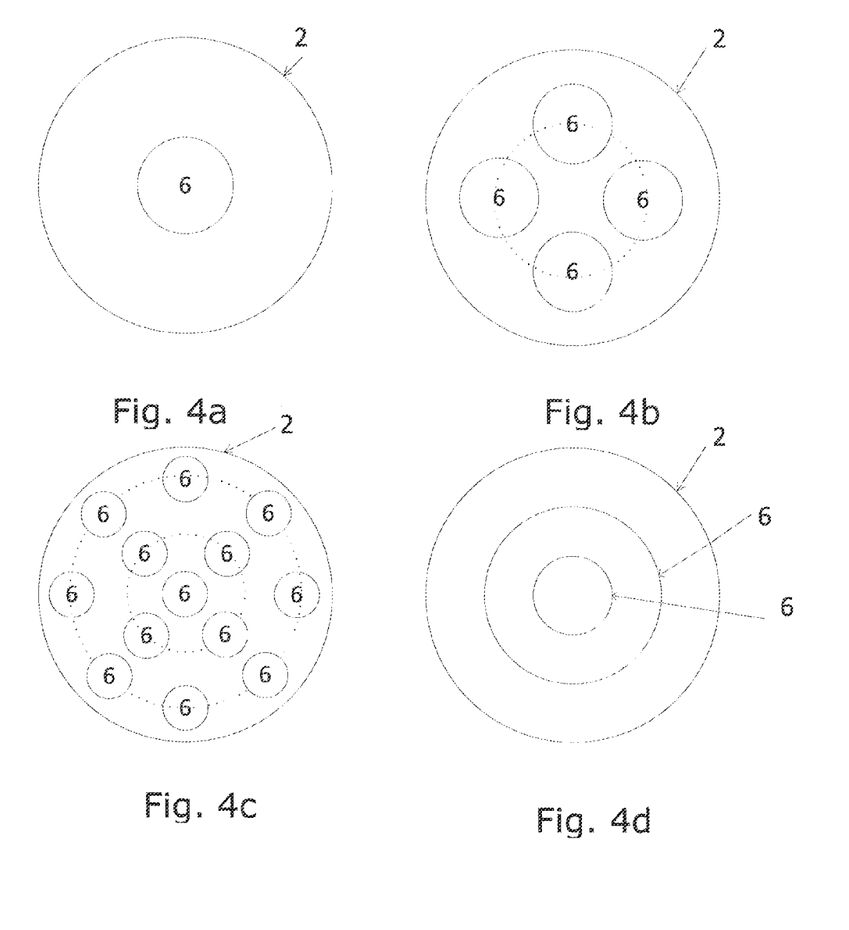

FIGS. 4a-d each show a preferred embodiment of a container 2 with an airlift; the figures each show the container from above with only the tube 6 of the airlift shown for clarity reason only (the containers typically also comprises second air supplies 16 and other features as disclosed in connection with FIG. 1). The other details of the system may be arranged as disclosed e.g. connection with FIGS. 1 and 2, that is in particular, the second air supply 16 being arranged at the intersection between the side wall of the container 2 and the bottom of the container 2. A container —or container system —according to the invention may comprise a plurality of airlifts, which is a plurality of vertically arranged tubes 6 each with a first air supply 8. However, it is generally preferred to have only a single second air supply 16 which is arranged at the corner(s) of the container 2, that is at the intersection between the side wall(s) of the container 2 and the bottom of the container 2.

the embodiment shown in FIG. 4a resembles the containers shown in FIGS. 1 and 2 and comprises a single vertically arranged tube 6. The tube 6 is arranged co-axially with the cylindrically shaped container 2.

In the embodiment shown in FIG. 4b, four tubes 6 are arranged internally in the container 2. The four tubes are distributed with their centres on a circle (shown by dotted lines) being co-centric with a cross section of the container 2. Furthermore, the tubes 6 are angular spaced by 90° measured as the angle between the centre two neighbouring tubes 6 and the centre of the container 2.

In the embodiment shown in FIG. 4c, thirteen tubes 6 are arranged internally in the container 2. One tube 6 is arranged in the centre of the container 2 and the remaining twelve are distributed along the perimeter of two concentric circles (shown by dotted lines) which two circles share a common centre with the cylindrically shaped container 2, thereby defining two layers of the tubes 6. The tubes of each layer are angular equal distributed, that is in the outer most layer having eight tubes 6 they are distributed by 45° and in the layer with four tubes 2, there are distributed by 90°.

In the embodiment of FIG. 4d, two tubes 6 are concentric arranged with a common centre for the two tubes 6 and the cylindrically shaped container 2. Each of the vertically arranged tube 6 has its own first gas supply 8.

Figure 5:
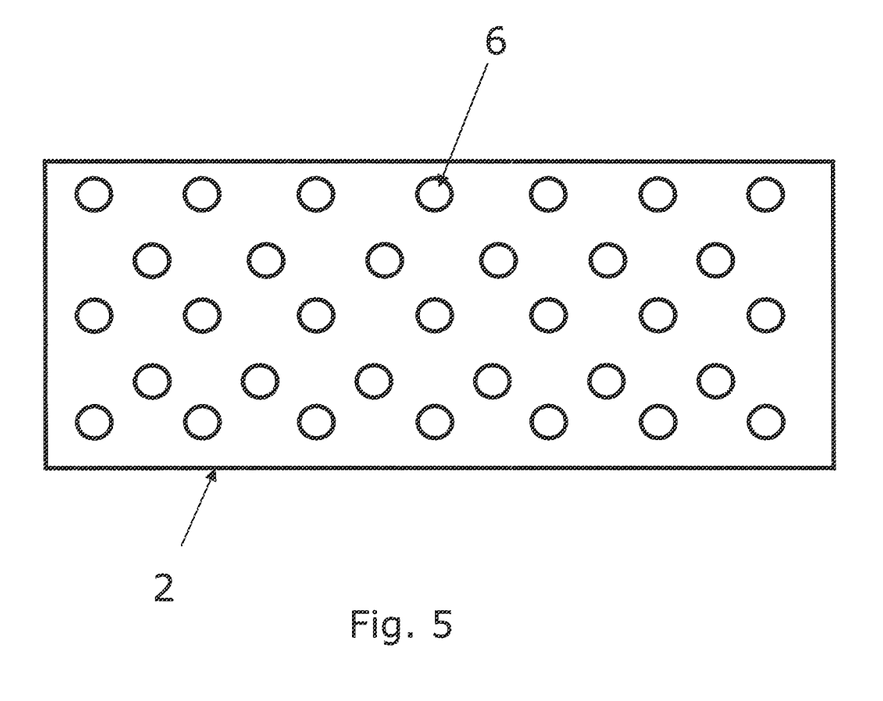
FIG. 5 shows schematically a preferred embodiment of a container with a number of airlifts distributed with equal distance between them inside a container having a rectangular cross section, the figure shows the container from above with only the vertically arranged tube shown for clarity reason only.

FIG. 5 shows schematically a preferred embodiment of container 2 with a number (thirty three) of airlifts distributed with equal distance between them inside a container 2 having a reactangular cross section. Again, only the tubes 6 of the airlifts are shown in the container 2. As it also appears from FIG. 6, the tubes 6 are arranged in staggered layers.

Thus, although the embodiments disclosed in FIGS. 1 and 2 discloses a container having a single vertically arranged tube 6 with a first gas supply 8, a container according to the recent invention may advantageously have a plurality, such as 2, 3, 4, 5, 6, 7, 8 or more, of vertically orientated tubes 6 preferably each with their own first gas supply 8 arranged in the container 2. The lower end of such tubes 6 are typically raised above the bottom of the container 2.

During use, the container 2 contains liquids and bio-film carriers. The bio-film carriers are preferably elements having an outwardly open cell structure for increasing the overall surface of the particles. Typically preferred bio-film carriers are elements having a mineral grain-like structure or having a cave-like surface structure like the pattern on a golf ball.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A container for biological treatment of liquid such as water and for circulating bio-film carriers in the container, the container comprising:
   a bottom, one or more side walls, an upper end, and a liquid inlet for inletting liquid to be treated into the container,
   at least one vertically orientated open ended tube with a lower end having an opening at the bottom of the container and opposite an upper end having an opening towards the opening of the upper end of the container and being arranged in the container, the lower end of said tube being raised above the bottom of the container to allow passage of bio-film carriers from the bottom of the container and into the tube,
   an adjustable first gas supply arranged to supply gas inside the tube at the lower end of said tube for creating and adjusting a first circulating flow (F1) of liquids and bio-film carriers to rise upwardly through the vertically orientated tube when in intended operation,
   an adjustable second gas supply arranged at the intersection between the side wall(s) of the container and the bottom of the container, for creating and adjusting a second circulating flow (F2) of liquids and bio-film carriers to raise upwardly in the vicinity of the side wall(s) when in intended operation, to generate an upwardly directed flow of the first circulating flow (F1) inside the tube that is distinct from the upwardly directed second circulating flow (F2) outside the tube and in the vicinity of the wall and arranged in a manner so that the downwardly directed flows of the first and second flows (F1, F2) are interacting between the tube and the wall(s) of the container, and
   the container comprising an outflow channel extending along and throughout a perimeter of an upper part of the container wall, the outflow channel having
      a fluid penetrable and bio-film carrier stopping wall section facing inwardly towards the opening at the upper end of the tube and the upwardly rising first circulating flow (F1) so that fluids may flow from the interior of the container, through the fluid penetrable wall section and into the outflow channel and to an outlet for leading fluids out from the outflow channel when in intended operation and with the circulating flows (F1, F2) washing away bio-film carriers preventing clogging and retaining bio-film carriers in the container.

2. The container according to claim 1, wherein the first gas supply is arranged at the lower end of said tube for producing gas bubbles entering into the tube through openings provided in the tube at the lower end thereof, the gas bubbles rising upwardly inside the tube for creating the first circulating flow (F1) of liquids and bio-film carriers rising upwardly through the vertically orientated tube when in intended operation.

3. The container according to claim 2, wherein the openings and first gas supply are arranged no further away from the lower end of the tube than one diameter of the tube.

4. The container according to claim 1, wherein the region in between the fluid penetrable wall section being devoid of obstacles.

5. The container according to claim 1, wherein the region in between the fluid penetrable wall section being devoid of obstacles except from a part of the vertically orientated tube.

6. The container according to claim 1, wherein the section of the side wall of the container below the upper part is tubular shaped, and wherein the container comprises a disc-shaped bottom, the sidewall and the bottom being made from fluid tight materials, and if not made integrally, then attached to each other in a fluid tight manner.

7. The container according to claim 1, wherein the upper part of the container comprises a funnel shaped part extending in a contracting manner from an upper position of the sidewall(s) to the fluid penetrable wall section.

8. The container according to claim 1, wherein the outlet flow channel is tubular shaped.

9. The container according to claim 1, wherein the fluid penetrable wall section is tubular shaped.

10. The container according to claim 1, wherein fluid penetrable wall section forms discrimination means, established by the penetration being provided by bores of a pre-selected size, for detaining the biofilm carriers in the container.

11. The container according to claim 1, wherein the second gas supply is arranged to supply atmospheric air, oxygen and/or gas at the bottom of the container for creating a flow in a stagnant liquid regions.

12. The container according to claim 1, wherein the vertically orientated tube is adjustably raised a distance over the bottom of the container for adjusting the flow of liquids and carriers towards and up through the tube.

13. The container according to claim 1, wherein the vertically orientated tube is cylindrically shaped throughout its length.

14. The container according to claim 1, wherein the vertically orientated tube has at least a section which is funnel shaped.

15. The container according to claim 14, wherein the funnel shaped section widens in a direction towards the upper end of the container.

16. The container according to claim 14, wherein the funnel shaped section widens in a direction towards the bottom of the container.

17. The container according to claim 1, wherein the first gas supply is arranged for being an adjustable supply of gas up through the vertically orientated tube, the first gas supply receiving gas via a first inlet.

18. The container according to claim 17, wherein the first gas supply is arranged internally in the container and at the lower end of the vertically orientated tube.

19. The container according to claim 1, wherein the vertically orientated tube is arranged in the centre of the container.

20. The container according to claim 1, including a plurality of vertically orientated tubes distributed over a bottom area of the container.

21. The container according to claim 1, wherein the distance between the lower end of the vertically orientated tube and the bottom of the container is less than one diameter of the vertically orientated tube, the diameter being determined as the hydraulic diameter in cases where the cross section is not circular, at the lower end of the vertically orientated tube.

22. The container according to claim 1, wherein the container comprises a plurality of vertically orientated tubes arranged therein, the lower end of said tubes being raised above the bottom of the container, and comprising a first gas supply arranged at the lower end of each of said tubes for creating a first circulating flow (F1) of liquid and bio-film carriers of the container though each of said tubes.

23. The container according to claim 1, wherein the bio-film carriers are elements have an outwardly open cell structure for increasing the overall surface of the particles.

24. The container according to claim 1, wherein the bio-film carriers are elements having a mineral grain-like structure, having a cave-like surface structure like the pattern on a golf ball, being extruded or injection moulded.

25. The container according to claim 1, wherein the container has an open end at the upper end of the container to allow discharge of gas.

26. The container according to claim 1, wherein the container comprising a top and a gas outlet, said top seals the upper end of the container to prevent discharge of gas through other openings than the gas outlet.

27. The container according to claim 1, wherein the container further comprises a micro-bubble diffuser arranged below the lower end of the vertically arranged tube, the micro-bubble diffuser being adapted to produce gas bubbles by having a surface with small pores through which the gas or air is flowing out from.

28. The container according to claim 1, wherein the container further comprises a booster for injecting gas into the interior of the vertically arranged tube at a position raised above the lower end of the vertically arranged tube.

29. The container according to claim 28, wherein the booster comprises a flow channel encircling the vertically arranged tube and bores are provided allowing gas to flow out of the flow channel and into the interior of the vertically arranged tube.

30. The container according to claim 1, wherein the container comprises a recirculation loop for recirculating gas produced in the container and/or gas supplied from a gas source to the first gas supply, the second gas supply, the booster and/or a micro bubble diffuser, and wherein the first outlet is also connected to second gas supply.

31. A system for biological treatment of liquids such as water, the system comprises a plurality of containers according to claim 1, for treatment of the liquids with different purification techniques, wherein the containers are serially connected so that an inlet of a downstream container is connected to an outlet of an upstream container, thereby enabling that liquids leaving said upstream container through the outlet enter into said downstream container through its inlet.

32. The system according to claim 31, wherein a first inlet and first outlet of each container in a first number of containers are connected, so that gas produced in each of the first number of containers is recirculated back to the same container, and wherein first inlets and second outlets, respectively, for a second number are connected so that gas produced in the second number of containers is mixed together and distributed to the containers of the second number of containers.

* * * * *